(No Model.)
U. E. PENNEY.
CYCLOMETER.
No. 562,415. Patented June 23, 1896.
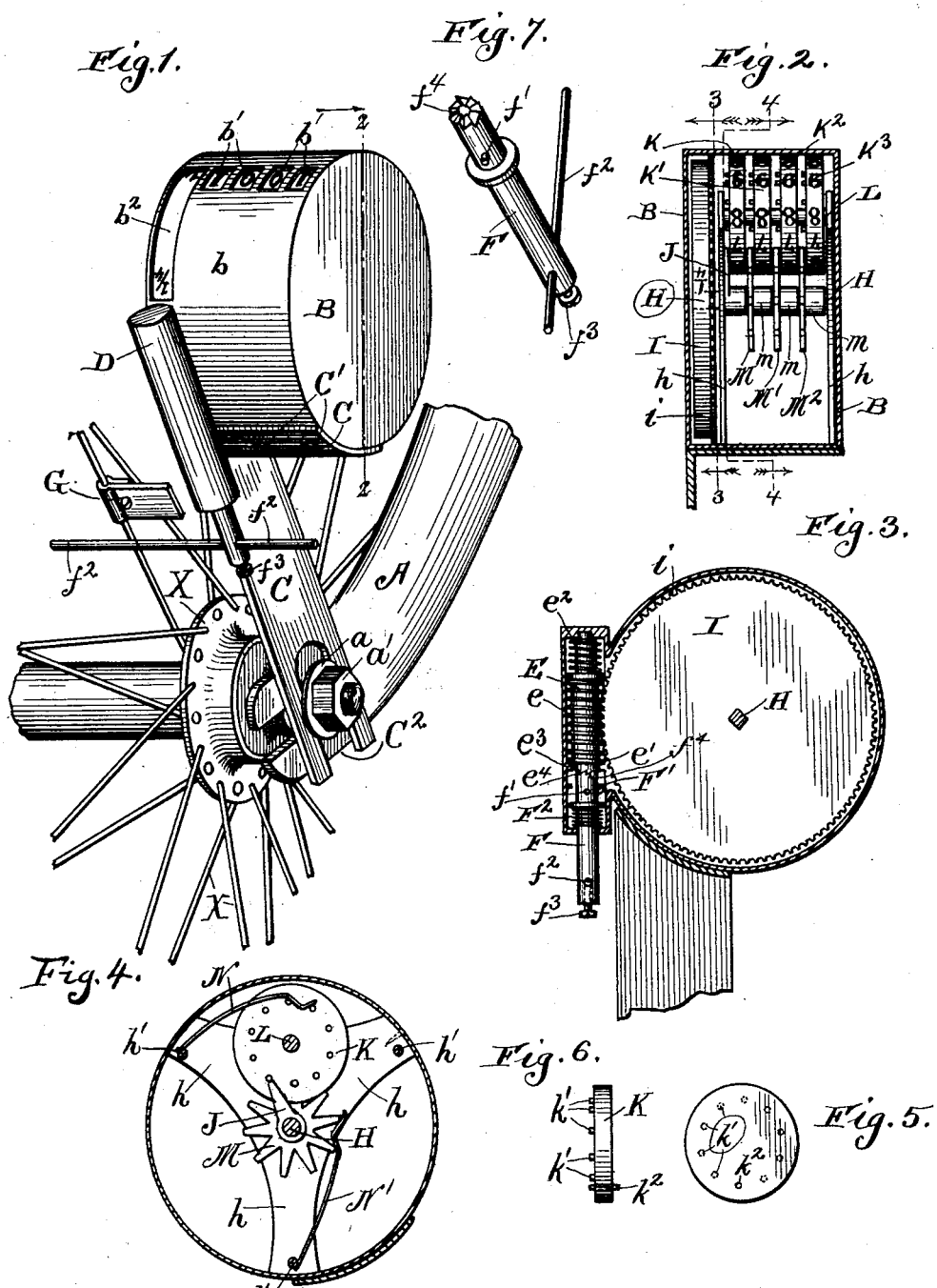
Witnesses:
R. J. Jacker.
Flora L. Brown.
Inventor:
Urial E. Penney,
By Charles Turner Brown,
Atty.

UNITED STATES PATENT OFFICE.

URIAL E. PENNEY, OF CHICAGO, ILLINOIS, ASSIGNOR OF ONE-HALF TO HARRIS HAAS, OF SAME PLACE.

CYCLOMETER.

SPECIFICATION forming part of Letters Patent No. 562,415, dated June 23, 1896.

Application filed July 11, 1895. Serial No. 555,653. (No model.)

*To all whom it may concern:*

Be it known that I, URIAL E. PENNEY, a resident of Chicago, in the county of Cook and State of Illinois, have invented certain new and useful Improvements in Cyclometers, of which the following, when taken in connection with the drawings accompanying and forming a part hereof, is a full and complete description, sufficient to enable those skilled in the art to which it pertains to make, understand, and use the same.

The invention relates to machines arranged to be attached to a bicycle, and to be actuated by the rotation of the wheels thereof, or one of them, and thereby to register the distance traveled by the bicycle; and the object of the invention is to obtain a cyclometer which can be readily attached to a bicycle, and adjusted thereto, and by means of which the distance in miles shall be registered in a manner whereby it can be readily read.

A further object of the invention is to obtain a cyclometer which shall be simple in construction and effective in operation and not liable to get out of repair.

In the drawings referred to as forming a part of this specification, Figure 1 is a perspective view of a portion of the front fork of a bicycle and a perspective view of a device embodying my invention secured to such fork in an operative position. Fig. 2 is a vertical sectional view on line 2 2 of Fig. 1, viewed in the direction indicated by the arrows. Fig. 3 is a vertical sectional view on line 3 3 of Fig. 2, viewed in the direction indicated by the arrows. Fig. 4 is a sectional view on line 4 4 of Fig. 2, viewed in the direction indicated by the arrows. Fig. 5 is an elevation of one of the wheels forming a part of the construction embodying my invention, such wheel having on the periphery thereof figures for registering the miles traveled by the machine to which the cyclometer is attached. Fig. 6 is a front view of such wheel, illustrated in Fig. 5; and Fig. 7 is a perspective view of a rocking-rod and a lever-arm attached thereto, by which motion is communicated from the machine to which the cyclometer is attached to the train of the cyclometer.

A letter of reference used to designate a given part is applied to indicate such part throughout the several figures of the drawings wherever the same appears.

A is the front fork of a bicycle, and B is a cyclometer embodying my invention secured thereto.

$b$ is the shell or case of the cyclometer.

$b'$ $b'$ are openings through which the figures registering-miles on the periphery of the registering wheels are viewed, and $b^2$ is a slot extending a short distance peripherally in the shell or case, and through which the fractions of a mile traveled by the machine to which the cyclometer is attached are viewed.

C is an arm secured at one end, as by screws $c'$ $c'$, to shell $b$, and having fork $C^2$ at the other end, such fork fitting over the shaft of the front wheel of the bicycle and having the washer $a$ forced to close contact therewith by the nut $a'$.

D is a tube or cylinder secured to shell $b$ and forming the journal-bearing to the mechanism actuating the register-wheels of the cyclometer.

E is a shaft having worm $e$ thereon, arranged to rotate continuously in its journal-bearing, (tube D.)

$e'$ is a shoulder near the end of shaft E, and such shoulder is pressed by friction-spring $e^2$ against annular ring $e^3$, rigidly secured in the tube D.

$e^4$ are ratchet-teeth on the end of shaft E.

F is a rocking shaft journaled in tube D.

$f'$ is a projection (as by a pin) on rock-shaft F, and F' is a stationary beveled projection secured in tube D, so that when rock-shaft F is turned forward a given distance and projection $f'$ is brought in contact with the beveled face of such projection further rotation thereof will produce also longitudinal movement, and thereby such shaft F will be forced away from shaft E.

$f^2$ is a lever or arm extending through rock-shaft F, and $f^3$ is a set-screw by which the lever is held in adjustment, after being properly adjusted for engagement with the stop G on wheel X of the bicycle.

$f^4$ $f^4$ are ratchet-teeth on the end of the rock-shaft F adjacent to the rotating shaft E. Teeth $f^4$ $f^4$ are in contact with teeth $e^4$ on shaft E during part of the turning or rocking thereof, and until forced away therefrom by pin $f'$ coming in contact with the beveled head or projection $F'$.

$F^2$ is a spring secured at one end to rock-shaft F and at the other end to tube D. Spring $F^2$ tends to maintain rock-shaft F in its initial position and to return it to such initial position after being actuated by stop G.

H is a shaft rotatably mounted in frame $h$.

$h'$ $h'$ $h'$ are rods connecting and holding the sides forming frame $h$ firmly in place.

I is a registering-wheel firmly secured to shaft H, and $i$ are teeth on wheel I, engaging with worm $e$ on shaft E. Wheel I has figures on the periphery thereof registering, preferably, the fractions of a mile traveled by the bicycle to which the cyclometer is attached.

J is an arm or lever firmly secured to shaft H, and arranged to engage with pins $k'$ $k'$, respectively, on registering-wheel K, in the revolution of shaft H.

K $K'$ $K^2$ $K^3$ are registering-wheels loosely mounted on shaft L. Wheels K $K'$ $K^2$ $K^3$ are duplicates, and are provided with ten projections (as pins) $k'$ $k'$ on one side thereof and one projection (as a pin) $k^2$ on the other side thereof, and with figures registering (preferably in miles) the distance traveled by the bicycle to which the cyclometer is attached, on the periphery thereof, such figures being viewed through the holes $b'$ $b'$ $b'$ $b'$ in case or shell B.

M $M'$ $M^2$ are geared wheels loosely mounted on shaft H, so as to engage with the projections (forming gear-teeth) on wheels K $K'$ $K^2$ $K^3$, respectively, that is, wheel M is actuated by pin $k^2$ on wheel K, and as such wheel M rotates it engages with projections (or pins) $k'$ $k'$ on wheel $K'$. Wheel $M'$ is engaged in like manner by projection (or pin) $k^2$ of wheel $K'$ and engages with projection (or pin) $k'$ $k'$ of wheel $K^2$, and wheel $M^2$ is moved by the projection (or pin) $k^2$ of wheel $K^2$, and engages with projections (or pins) $k'$ $k'$ $k'$ of wheel $K^3$.

$m$ $m$ are tubes set loosely on shaft H, holding wheels M $M'$ $M^2$ in proper relative position. N is a spring having fingers engaging, respectively, with the projections $k'$ $k^2$ on wheels K $K'$ $K^2$ $K^3$, and $N'$ is a like spring having fingers engaging with the teeth of wheels M $M'$ $M^2$, respectively.

The manner of operation of the cyclometer embodying my invention is: Rotation of wheel X brings stop G into contact with arm or lever $f^2$, and moves such lever so as to turn rock-shaft F a sufficient distance to rotate shaft E the designed part or portion of a turn. If the shaft F is turned more than the shaft E is designed to be turned at one rotation of the wheel X, such shaft F will be forced longitudinally away from shaft E by projection $f'$ coming in contact with beveled stop $F'$, so that such further rotation of shaft F will not produce more than the determined rotation to shaft E. Rotation of shaft E produces rotation of wheel I by worm $e$ on shaft E engaging with teeth $i$ $i$ on wheel I. Wheel I has figures on the periphery thereof, registering the fraction of a mile the bicycle travels. Rotating of wheel I turns shaft H (to which shaft it is rigidly secured) and so turns the arm or lever J. At each revolution of arm or lever J it engages with one of the teeth $k'$ $k'$ on wheel K and rotates it so as to bring into view a next higher figure on the periphery of wheel K through opening $b'$ adjacent to opening $b^2$. The movement of transmitting-wheel M is obtained by pin $k^2$ on wheel K engaging with the teeth of transmitting-wheel M on the last tenth of each entire revolution of such wheel K, and by the movement of transmitting-wheel M movement of wheel $K'$ is obtained through the engagement of the teeth of wheel M with pins $k'$ $k'$ on wheel K. The entire revolution of wheel $K'$ produces in like manner (by means of transmitting-wheel $M'$) movement of the adjacent wheel $K^2$, and a revolution of wheel $K^2$ produces movement in wheel $K^3$ through transmitting-wheel $M^2$ in like manner; that is, by pin $k^2$ engaging with the teeth of transmitting-wheel $M^2$ on the last tenth part of each entire revolution of such wheel $K^2$, and turning it forward sufficiently so that such wheel turns a new indicating-number up to view on wheel $K^3$.

Having thus described my invention, what I claim as new, and desire to secure by Letters Patent, is—

1. In a cyclometer a revolving shaft having a worm thereon engaging with the teeth of a wheel, and ratchet-teeth on one end thereof, and a rock-shaft concentric with the first-named shaft, such rock-shaft having corresponding ratchet-teeth on the end thereof adjacent to the first-named shaft, a spring yieldingly holding the rock-shaft in its initial position, with the ratchet-teeth in engagement, and means for rocking the rock-shaft and for automatically moving it longitudinally and disengaging the ratchet-teeth after a determined forward movement of the rock-shaft: substantially as described.

2. In a cyclometer, the combination of a rotatable shaft and a rock-shaft concentric therewith, ratchet-teeth on the adjacent ends of the shafts, a friction-spring yieldingly holding the rotating shaft in a given position, a spring yieldingly holding the rock-shaft with the ratchet-teeth thereon in engagement with the ratchet-teeth on the rotatable shaft, a projection on the rock-shaft and a rigidly-secured beveled projection with which the projection on the rock-shaft engages after rocking a determined distance and by which it is moved longitudinally in its further rocking; a worm on the rotatable shaft, and a registering-wheel having teeth thereon engaging with the worm: substantially as described.

3. In a cyclometer, the combination of a cylindrical shell or case having openings therein through which numbers on the periphery of rotatably-mounted indicating-wheels can be viewed, indicating-wheels loosely mounted on a shaft so that the periphery thereof, on one side of the wheels, is near to the openings through which they are viewed, a second shaft parallel with the first-named shaft, a registering-wheel and an arm engaging with pins forming teeth on one of the loosely-mounted registering-wheels, secured to the last-named shaft, loosely-mounted transmitting-wheels on the last-named shaft, worm-teeth on the last-named registering-wheel, a worm-shaft journaled in a tube forming part of the shell, a rock-shaft journaled in such tube, such shafts having engaging ratchet-teeth on the ends thereof, a spring yieldingly holding the rock-shaft in its initial position, and an arm on the rock-shaft, with a projection on the bicycle-wheel engaging with such arm; substantially as described.

U. E. PENNEY.

In presence of—
CHARLES T. BROWN,
FLORA L. BROWN.